(12) United States Patent
Xu et al.

(10) Patent No.: US 9,268,999 B2
(45) Date of Patent: Feb. 23, 2016

(54) TABLE RECOGNIZING METHOD AND TABLE RECOGNIZING SYSTEM

(71) Applicants: Peking University Founder Group Co., Ltd., Haidian District, Beijing (CN); Founder Apabi Technology Limited, Haidian District, Beijing (CN)

(72) Inventors: Canhui Xu, Beijing (CN); Zhi Tang, Beijing (CN); Jianbo Xu, Beijing (CN); Xin Tao, Beijing (CN)

(73) Assignees: Peking University Founder Group Co., Ltd., Haidian District, Beijing (CN); Founder Apabi Technology Limited, Haidian District, Beijing (CN)

( * ) Notice: Subject to any disclaimer, the term of this patent is extended or adjusted under 35 U.S.C. 154(b) by 24 days.

(21) Appl. No.: 14/096,532

(22) Filed: Dec. 4, 2013

(65) Prior Publication Data

US 2015/0093021 A1 Apr. 2, 2015

(30) Foreign Application Priority Data

Sep. 29, 2013 (CN) .......................... 2013 1 0455065

(51) Int. Cl.
*G06K 9/62* (2006.01)
*G06K 9/00* (2006.01)
(52) U.S. Cl.
CPC ........ *G06K 9/00449* (2013.01); *G06K 9/00463* (2013.01)
(58) Field of Classification Search
CPC ... G06K 9/00449; G06K 9/626; G06T 7/0093
USPC ....................................................... 382/159
See application file for complete search history.

(56) References Cited

U.S. PATENT DOCUMENTS

| 5,528,701 A * | 6/1996 | Aref ................... G06K 9/00879 382/178 |
| 2006/0155699 A1* | 7/2006 | Purvis ................... G06F 17/248 1/1 |
| 2009/0044106 A1* | 2/2009 | Berkner ................ G06F 17/211 715/273 |
| 2009/0144614 A1* | 6/2009 | Dresevic ............. G06F 17/2205 715/239 |
| 2012/0324341 A1* | 12/2012 | Dejean .................. G06F 17/211 715/243 |
| 2013/0318426 A1* | 11/2013 | Shu ........................ G06F 17/243 715/226 |
| 2014/0079316 A1* | 3/2014 | Vitaladevuni ......... G06T 7/0079 382/159 |
| 2014/0219526 A1* | 8/2014 | Linguraru .......... G06K 9/00281 382/128 |
| 2015/0110349 A1* | 4/2015 | Feng et al. ..................... 382/103 |
| 2015/0142707 A1* | 5/2015 | Charif .................. G06N 99/005 706/12 |

* cited by examiner

*Primary Examiner* — Gregory F Cunningham
(74) *Attorney, Agent, or Firm* — Merchant & Gould P.C.

(57) ABSTRACT

Provided is a table recognizing method, comprising: parsing and analyzing metadata information in an original fixed-layout document, and extracting basic elements on a page of the document; segmenting the basic elements, extracting segmented text lines on the page, and acquiring fragments; constructing an undirected graph with respect to each of the fragments; extracting an image on the page, detecting intersection points of horizontal lines and vertical lines, detecting an external bounding box of the intersection points, and taking whether the segmented text lines fall within the external bounding box as local relationship features; training a learning model according to the local relationship features, local features of the fragments, and neighborhood relationship features among the fragments, acquiring model parameters, and establishing a table recognizing model; and invoking the table recognizing model to perform table recognizing for the document, and acquiring a recognizing result.

20 Claims, 4 Drawing Sheets

| Symbol | Description |
|---|---|
| $P_i$ | $i$-th device profile |
| $D_j(k)$ | $k$-th version of data item $D_j$ |
| $N_{User}$ | Number of users in the cell |
| $\lambda_{Ctrl.}$ | Aggregate request rate in the cell |
| $\mu_{Ctrl.}$ | Service rate of the control channel |
| $\mu_{Sche.}$ | Service rate of the cache |
| $\mu_{BCast.}$ | Service rate of the broadcast channel |
| $\sigma_{Sche.}$ | Standard deviation of the service time of the cache |
| $B_{Ctrl.}$ | Bandwidth of the control channel |
| $B_{BCast.}$ | Bandwidth of the broadcast channel |

TABLE I
DESCRIPTION OF SYMBOLS

The rate that a service handoff is forced to terminate is called the *service dropping rate* (abbreviated as SDR).

III. ANALYTICAL AND TRANSCODING MODELS

A. Analytical Model

In this subsection, we derive the worst case of the average access time of QTP, and use the derived results to guide the version decision policy and the server admission control scheme proposed in Section IV. To facilitate the following discussion, we make the following assumptions.

1) The employed scheduling scheme of the scheduler is FCFS (standing for first come, first serve).
2) No request merge occurs in the data request queue of the scheduler.
3) One transmission of a data object in the broadcast channel is received by exactly one client.
4) The messages of registration, de-registration and handoff are negligible.

Assumptions 2 and 3 occur when the users' interests are highly diverse, and hence the effect of on-demand broadcast is eliminated. We make these two assumptions since we focus on the worst case of the transcoding proxy. Assumption 4 is made since we focus on the the situation that the number of data requests is much higher than the number of control messages (i.e., registration, de-registration, handoff and service termination). These assumptions will be relaxed in our simulation model described in Section V. For better readability, a list of used symbols is shown in Table 1.

We model QTP as a queueing network as shown in Figure 3. Queue 2 is a physical queue which is located in the scheduler. On the contrary, Queue 1 and Queue 3 are logical queues which are only used to model the control and broadcast channels in order to derive the average waiting time of a data request on the control and broadcast channels, respectively. Suppose that the data requests submitted by a mobile user $i$ in service follow a Poisson process with rate $\lambda_i$, and $N_{User}$ is the number of mobile users in service in the cell. To facilitate the following discussion, we number the mobile users in the cell as user $1, 2, \cdots, N_{User}$. Due to the characteristic of the Poisson process, the aggregate data requests of all mobile users in the cell follow a Poisson process with rate $\lambda_{Ctrl.} = \sum_{i=1}^{N_{User}} \lambda_i$. Denote the sizes of data requests and request acknowledgements as $s_{Ctrl.}$ and $s_{Ack.}$, respectively.

Fig. 3. The analytical model of the proposed transcoding proxy

We also let $B_{Ctrl.}$ be the bandwidth of the control channel, and let the waiting time of the control channel for a data request (denoted as $W_{Ctrl.}$) be the time interval between the user sending a data request and the user receiving the acknowledge. Then, we have the following lemma.

Lemma 1: The average waiting time of the control channel can be formulated as below.

$$W_{Ctrl.} = \frac{1}{\frac{B_{Ctrl.}}{s_{Ctrl.} + s_{Ack.}} - \lambda_{Ctrl.}}.$$

Let the waiting time of the scheduler for a data request (denoted as $W_{Sche.}$) be the time interval from the arrival of the data request from the scheduler's perspective to the time that the requested data object has been obtained by the scheduler. Note that the service time of a cache manager is affected by several factors such as cached status of required data objects, the employed replacement scheme, the characteristic of the input jobs, and so on. The service time of the cache manager cannot be modeled by a particular mathematical distribution. Therefore, we model the average service time of the cache manager as an arbitrary distribution with mean $\frac{1}{\mu_{Sche.}}$ and variance $\sigma_{Sche.}^2$. Suppose that $\rho_{Sche.} = \frac{\lambda_{Ctrl.}}{\mu_{Sche.}}$ is the load of the scheduler. We then have the following lemma.

Lemma 2: The average waiting time of the scheduler is $$W_{Sche.} = \frac{1}{\mu_{Sche.}} + \frac{\frac{\rho_{Sche.}}{\mu_{Sche.}} + \lambda_{Ctrl.}\sigma_{Sche.}^2}{2(1 - \rho_{Sche.})}.$$

Let the waiting time of the broadcast channel for a data request be the time interval between the time that the requested data object has been obtained by the scheduler and the time that the user has received it. Then, we have the following lemma.

Lemma 3: The average waiting time of the broadcast channel can be formulated as $$W_{BCast} = \frac{1}{\mu_{BCast}(1 - r_0)},$$

TABLE RECOGNIZING METHOD AND TABLE RECOGNIZING SYSTEM

This application claims benefit of Serial No. 201310455065.0, filed 29 Sep. 2013 in China and which application is incorporated herein by reference. To the extent appropriate, a claim of priority is made to each of the above disclosed applications.

BACKGROUND OF THE INVENTION

1. Field of the Invention

The present invention relates to the field of electronic document format conversion technologies, and in particular to a table recognizing method and a table recognizing system based on Probabilistic Graphical Models (PGM).

2. Description of the Prior Art

According to a generation process of typographic documents, a document is a set of data and structures, specifically comprising content data, a physical structure, and a logical structure. Document analysis refers to extraction of the physical structure of the document, whereas document understanding refers to construction of a mapping relationship between the physical structure and the logical structure. In practice, with respect to readability requirements of a mobile terminal, recovery of the physical and logical structures is significantly important. Table detection and recognizing on a document page is one of the critical issues in document understanding. The table, with an independent logical function, needs to be subject to physical segment and logical labeling. In a fixed-layout document, a table object may be constituted by numerous text elements (primitives) and operations, or may be integrally from one image graphic element.

Tables are an important part of a document. Therefore, it is especially important for analysis of a fixed-layout document as how to accurately recognize tables and contents in the tables. In the prior arts, some methods for recognizing and converting tables in the fixed-layout document are available. For example, the table in a PDF document is converted into an Excel table. To be specific, border coordinates of text blocks of the table in the PDF document are firstly recognized, row segment and column segment are performed for the table in the PDF document according to the border coordinates of the text blocks to acquire a plurality of segmented areas, a segmented area to which each of the text blocks belongs is determined, and the text blocks in the segmented areas are stored into the corresponding Excel table. In this way, the table with no border lines or incomplete border lines in the PDF document can be converted into an Excel table, without depending on the border lines of the table in the PDF document. This solution is defective in that detection of the border lines is a traditional rule-based table segmenting method, during recognizing of the border coordinates of the text blocks in the table, no other texts are allowed to be outside the table; otherwise, the texts outside the table may be mistakenly recognized as the text in the table. However, in a practical fixed-layout document, a larger number of logical blocks, for example, photograph, title and text body, may exist outside the table. Visually, most tables may not be obviously differentiated from the text body paragraphs, and the tables have diversified styles. As a result, a rule-based method may not recognize border lines of the table with other logical blocks. And thus the logical blocks of the table tend to be mistakenly recognized as a part within the table. Therefore, it is difficult to locate the practical table as an integrity, and the recognizing effect fails to satisfy actual requirements.

SUMMARY OF THE INVENTION

In view of the problems that exist in the prior arts, when other logical blocks exist outside the table, border lines between the table and the other logical blocks are difficult to be recognized, embodiments of the present invention provide a probability model-based table recognizing method capable of locating border lines of the table and forming the table and the other logical blocks into a logically significant complete block.

To address the above technical problems, embodiments of the present invention provide a table recognizing method and a table recognizing system based on the PGM.

An embodiment of the present invention provides a table recognizing method, comprising:

parsing and analyzing metadata information in an original fixed-layout document, and extracting basic elements on a page of the document;

segmenting the basic elements, extracting segmented text lines on the page, and acquiring fragments;

constructing an undirected graph with respect to each of the fragments;

extracting an image on the page, detecting intersection points of horizontal lines and vertical lines, detecting an external bounding box of the intersection points, and taking whether the segmented text lines fall within the external bounding box as local relationship features;

training a learning model according to the local relationship features, local features of the fragments, and neighborhood relationship features among the fragments, acquiring model parameters, and establishing a table recognizing model based on the acquired model parameters; and invoking the table recognizing model to perform table recognizing for the document, so as to get a recognizing result.

Alternatively, in the process of, training a learning model according to the local relationship features, local features of the fragments, and neighborhood relationship features among the fragments, acquiring model parameters, and establishing a table recognizing model based on the acquired model parameters, the learning model is a Conditional Random Fields (CRF) model, and the process may comprise:

extracting the local features of fragments in the undirected graphs, classifying the extracted local features, converting a classification score into a pseudo probability, and taking the pseudo probability as a unary feature function of the CRF model; and extracting the neighborhood relationship features among the fragments according to graph neighborhood relationships, and using the extracted neighborhood relationship features as a binary feature function.

Alternatively, in the process of segmenting the basic elements, extracting segmented text lines on the page, and acquiring fragments, continuous texts in the text lines may be segmented into one fragment.

Alternatively, the segmented text lines on the page may be extracted based on clustering.

Alternatively, the undirected graph with respect to the each of the fragments may be constructed using a neighborhood relationship of the fragment.

Alternatively, the undirected graph with respect to the each of the fragments may be constructed based on a Minimal Spanning Tree (MST).

Alternatively, the intersection points of the horizontal lines and the vertical lines may be detected based on connected components.

Alternatively, the local features of the fragment may comprise: a length-to-width ratio, a normalized area, an indentation level, and an image textual feature.

Alternatively, the process of extracting the local features of fragments in the undirected graphs, classifying the extracted local features, and converting a classification score into a pseudo probability may comprise: classifying the extracted local features using a Support Vector Machine (SVM) classifier, selecting a Radial Basis Function (RBF), and converting a classification score into the pseudo probability.

Alternatively, the local relationship features may comprise: left alignment, right alignment, center alignment, and within or without external bounding box.

An embodiment of the present invention provides a table recognizing system, comprising:

an extracting unit, configured to parse and analyze metadata information in an original fixed-layout document, and extract basic elements on a page of the document;

a segmenting unit, configured to segment the basic elements, extract segmented text lines on the page, and acquire fragments;

a constructing unit, configured to construct an undirected graph with respect to each of the fragments;

a detecting unit, configured to extract an image on the page, detect intersection points of horizontal lines and vertical lines, detect an external bounding box of the intersection points, and take whether the segmented text lines fall within the external bounding box as a local relationship feature;

a modeling unit, configured to train a learning model according to the local relationship features, local features of the fragments, and neighborhood relationship features among the fragments, acquire model parameters, and establish a table recognizing model; and an invoking unit, configured to invoke the table recognizing model to perform table recognizing for the document, so as to get a recognizing result.

Alternatively, the learning model may be a CRF model, and the modeling unit may comprise:

a first feature extracting subunit, configured to extract the local features of fragments in the undirected graphs, classify the extracted local features; convert classification score into a pseudo probability, and take the pseudo probability as a unary feature function of the CRF model; and a second extracting subunit, configured to extract the neighborhood relationship features among the fragments according to graph neighborhood relationships, and use the extracted neighborhood relationships as a binary feature function.

Alternatively, the segmenting unit may be configured to segment continuous texts in the text lines into one fragment.

Alternatively, the segmenting unit may be configured to extract the segmented text lines on the page based on clustering.

Alternatively, the constructing unit may be configured to construct the undirected graph by using a neighborhood relationship of the fragments.

Alternatively, the constructing unit may be configured to construct the undirected graph with respect to the each of the fragments based on a minimal spanning tree.

Alternatively, the detecting unit may be configured to detect the intersection points of the horizontal lines and the vertical lines based on connected components.

Alternatively, the local features of the fragment may comprise: a length-to-width ratio, a normalized area, an indentation level, and an image textual feature.

Alternatively, the first feature extracting unit may be configured to classify the extracted local features using a Support Vector Machine (SVM) classifier, select a Radial Basis Function (RBF), and convert a classification score into the pseudo probability.

Alternatively, the local relationship features may comprise: left alignment, right alignment, center alignment, and within or without external-bounding box.

Compared with the prior art, the technical solutions provided in the embodiments of the present invention achieves the following advantages:

(1) According to the table recognizing method and the table recognizing system provided in the embodiments of the present invention, metadata information in an original fixed-layout document is parsed and analyzed, and basic elements on a page of the document are extracted; text, images, and drawing operation information are found on the page, and are segmented to acquire fragments; an undirected graph is constructed with respect to each of the fragments; an image is extracted on the page, intersection points of horizontal lines and vertical lines are detected, an external bounding box of the intersection points is detected, and whether the segmented text lines fall within the external bounding box is taken as local relationship features; the local features of fragments in the undirected graph are extracted; a learning model is trained according to a neighborhood relationship among the fragments to acquire model parameters, and the final table recognizing result is adjusted. In this way, the border lines between the table and other logical blocks may be recognized, the table is extracted, and logical labels are defined according to the logical function of the table, thereby implementing typographic analysis and understanding on the table an original fixed-layout document. In addition, table recognizing may also be based on analysis of the logical function of the table, thereby improving accuracy in table recognizing on the original fixed-layout document. According to the table recognizing method provided in the embodiments of the present invention, a learning model is trained according to the local relationship features, local features of the fragments, and neighborhood relationship features among the fragments, thereby constructing a better model and improving table recognizing efficiency.

(2) According to the table recognizing method provided in the embodiments of the present invention, a CRF model is employed; a unary feature function of the CRF model is acquired according to the local features of the fragments, and the neighborhood relationship features among the fragments are used as a binary feature function; and the CRF is trained based on the unary and binary feature functions. The multi-feature design covers unary local features and binary neighborhood features. The unary features are mainly features of the fragments, and the binary features are relationship features of the neighbor fragments in the undirected graphs. The target function of the CRF model is a negative log-likelihood function. By using multiple features and various contextual information, ambiguous classification results can be reduced.

(3) According to the table recognizing method provided in the embodiments of the present invention, texts aggregated as text line are segmented into one fragment; wherein graphic composite fragments are obtained by processing homogenous graphic elements, text elements, image elements, and image elements having geometric proximity are arranged in the same fragment. With the segmented fragments at hand, a basis is laid for construction of the undirected graphs and extraction of the features of the fragments.

(4) According to the table recognizing method provided in the embodiments of the present invention, an undirected graph is constructed according to neighborhood relationship among the fragments. In this way, a relative position relationship between the fragments can be reflected in the undirected graph, the undirected graph is generated according to a neighbor position relationship, and the undirected graph is constructed based on a minimal spanning tree. Since the undirected graph may better represent the neighborhood relationship features, the undirected graph provides convenience to the extraction of the local features and neighborhood relationship features of the fragments, thereby ensuring accuracy and high efficiency of the feature extraction.

(5) According to the table recognizing method provided in the embodiments of the present invention, during cell detection, intersection points of horizontal lines and vertical lines are detected based on connected components, thereby better acquiring edge outlines of cells in the table.

BRIEF DESCRIPTION OF THE DRAWINGS

For a better understanding of the disclosure in the embodiments of the present invention, the present invention is described in retail as follows with reference to specific embodiments and accompanying drawings. Among the drawings.

DETAILED DESCRIPTION OF THE PREFERRED EMBODIMENTS

Figure 1:
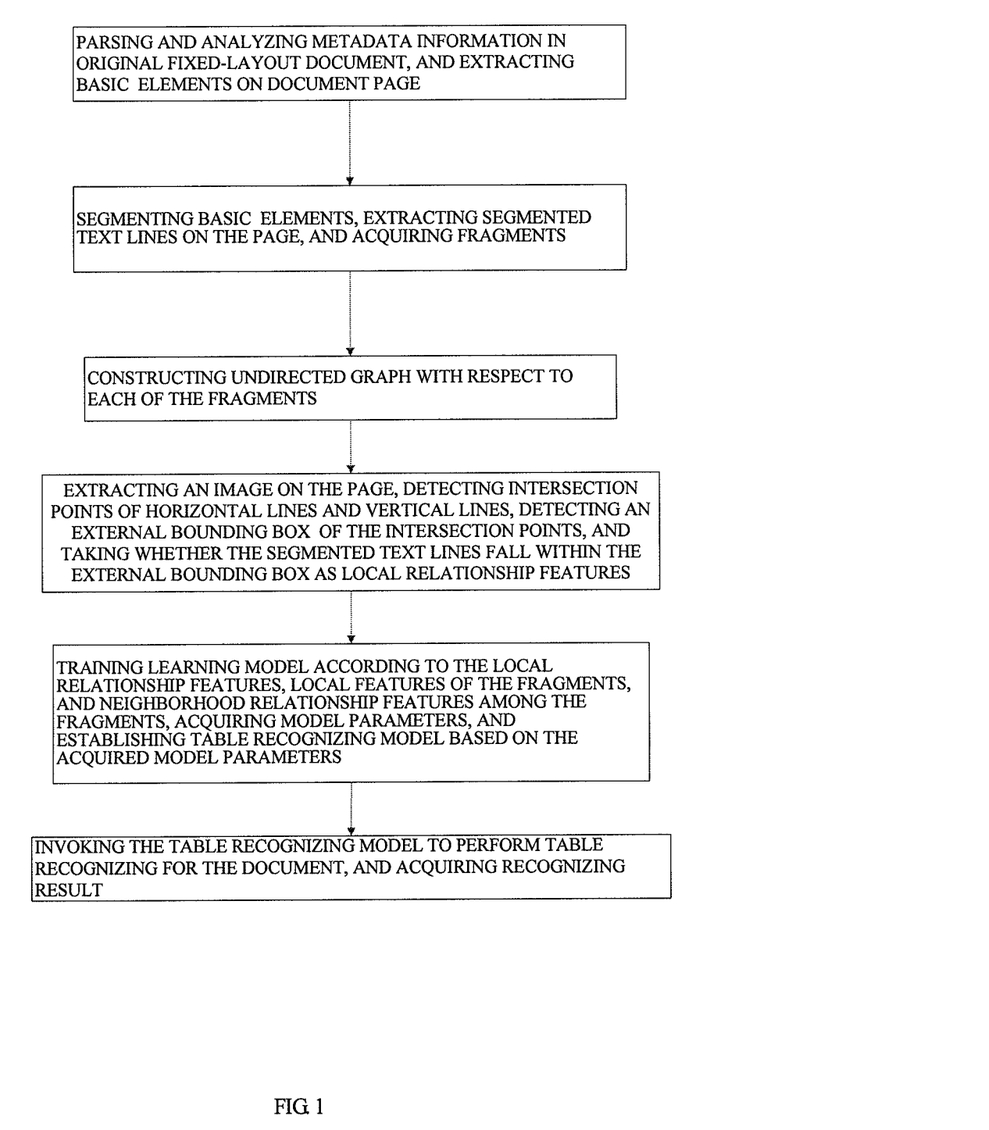
FIG. 1 is a flowchart of a table recognizing method according to an embodiment of the present invention.

Embodiment 1:

This embodiment provides a table recognizing method, as illustrated in FIG. 1, comprising the following steps:

(1) parsing and analyzing metadata information in an original fixed-layout document, and extracting basic elements on a page of the document; wherein basic elements on the page may be extracted using an analysis tool in the prior art; and the basic elements may comprise numerous text elements, image elements, and graphical operation information;

(2) segmenting the basic elements, extracting segmented text lines on the page, and acquiring fragments; in this step, continuous texts are segmented into one fragment; wherein properties of the basic elements are segmented based on relationships between neighboring elements, and fragments are thus acquired; and the segmented text lines on the page are acquired based on clustering and by means of clustering analysis;

(3) constructing an undirected graph with respect to each of the fragments; wherein the undirected graph with respect to the each of the fragments is constructed based on a minimal spanning tree; and the neighborhood relationship refers to neighborhood relationship information such as neighborhood, while position relationship information of a fragment refers to its adjacent fragments;

(4) extracting an image on the page; detecting intersection points of horizontal lines and vertical lines based on connected components; detecting an external bounding box of the intersection points; and taking whether the segmented text lines fall within the external bounding box as a local relationship feature;

(5) training a learning model according to the local relationship features, local features of the fragments, and neighborhood relationship features among the fragments, acquiring model parameters, and establishing a table recognizing model; wherein the trained model may be a CRF model or a structural SVM, or other learnable models; the model training is performed based on the above features, and the machine constructs a table recognizing model by means of self-learning; and this method, where training is continued using a learnable model, improves trainability degree of the model, enhances efficiency and precision of model construction, and ensures accuracy of table recognizing;

(6) invoking the table recognizing model to perform table recognizing for the document, so as to get a recognizing result.

According to the table recognizing method provided in the embodiments of the present invention, the border lines between the table and other logical blocks can be recognized, the table is extracted, and logical labels are defined according to the logical function of the table, thereby implementing typographic analysis and understanding on the table in an original fixed-layout document. In addition, table recognizing may also be based on analysis of the logical function of the table, thereby improving accuracy in table recognizing in the original fixed-layout document. According to the table recognizing method provided in the embodiments of the present invention, a learning model is trained according to the local relationship features, local features of the fragments, and neighborhood relationship features among the fragments, thereby constructing a better model and improving table recognizing efficiency.

In an alternative embodiment, during establishment of the table recognizing model in step (5), the learning model may be a CRF model. Herein the process of model establishment may be as follows:

extracting the local features of fragments in the undirected graphs, classifying the extracted local features, converting a classification score into a pseudo probability, and taking the pseudo probability as a unary feature function of the condition random field model; in this embodiment, the local features of the fragment may comprise: a length-to-width ratio, a normalized area, an indent level, and an image textual feature. These local features are classified using an SVM classifier, an RBF is selected, and a classification score is converted into the pseudo probability. In this way, the unary feature function is acquired.

extracting the neighborhood relationship features among the fragments according to graph neighborhood relationships, and using the extracted neighborhood relationships as a binary feature function; wherein the local relationship features comprise: left alignment, right alignment, center alignment, and within or without external envelop; and then the local relationship features, local features of the fragments, and neighborhood relationship features among the fragments are inputted into the CRF model, model parameters are acquired, and a table recognizing model is established based on the parameters.

Embodiment 2:

This embodiment provides a table recognizing system, comprising:

an extracting unit, configured to parse and analyze metadata information in an original fixed-layout document, and extract basic elements on a page of the document;

a segmenting unit, configured to segment the basic elements, extract segmented text lines on the page, and acquire fragments; wherein the segmented text lines on the page are extracted based on clustering; and continuous texts in the text lines may be segmented into one fragment.

a constructing unit, configured to construct an undirected graph with respect to each of the fragments; wherein the undirected graph with respect to the each of the fragments is constructed based on a minimal spanning tree;

a detecting unit, configured to extract an image on the page, detect intersection points of horizontal lines and vertical lines based on connected components, detect an external bounding box of the intersection points, and take whether the segmented text lines fall within the external bounding box as a local relationship feature; wherein the local relationship features may comprise: left alignment, right alignment, center alignment, and within or without external bounding box;

a modeling unit, configured to train a learning model according to the local relationship features, local features of the fragments, and neighborhood relationship features among the fragments, acquire model parameters, and establish a table recognizing model; and an invoking unit, configured to invoke the table recognizing model to perform table recognizing for the document, so as to get a recognizing result.

In a preferred embodiment, in the modeling unit, the learning model may be a CRF model, and the modeling unit may further include:

a first feature extracting subunit, configured to extract the local features of fragments in the undirected graphs, classify the extracted local features, convert classification score into a pseudo probability, and take the pseudo probability as a unary feature function of the CRF model; and wherein the local features of the fragment comprise: a length-to-width ratio, a normalized area, an indentation level, and an image textual feature; and the extracted local features are classified using an SVM classifier, an RBF is selected, and the classification score is converted into the pseudo probability;

a second extracting subunit, configured to extract the neighborhood relationship features among the fragments according to graph neighborhood relationships, and use the extracted neighborhood relationships as a binary feature function.

Figure 2:
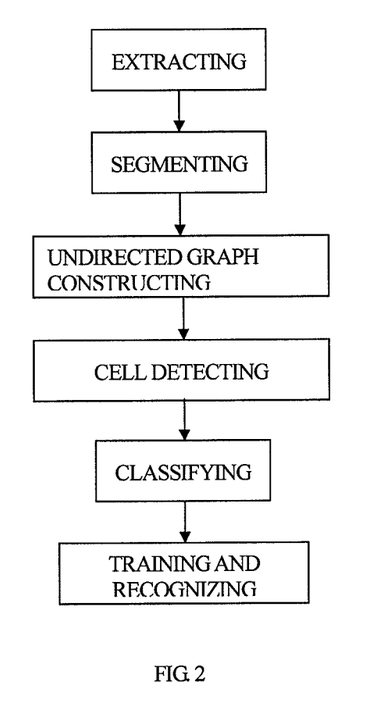
FIG. 2 is a flowchart of a table recognizing method according to another embodiment of the present invention.
Figure 3:
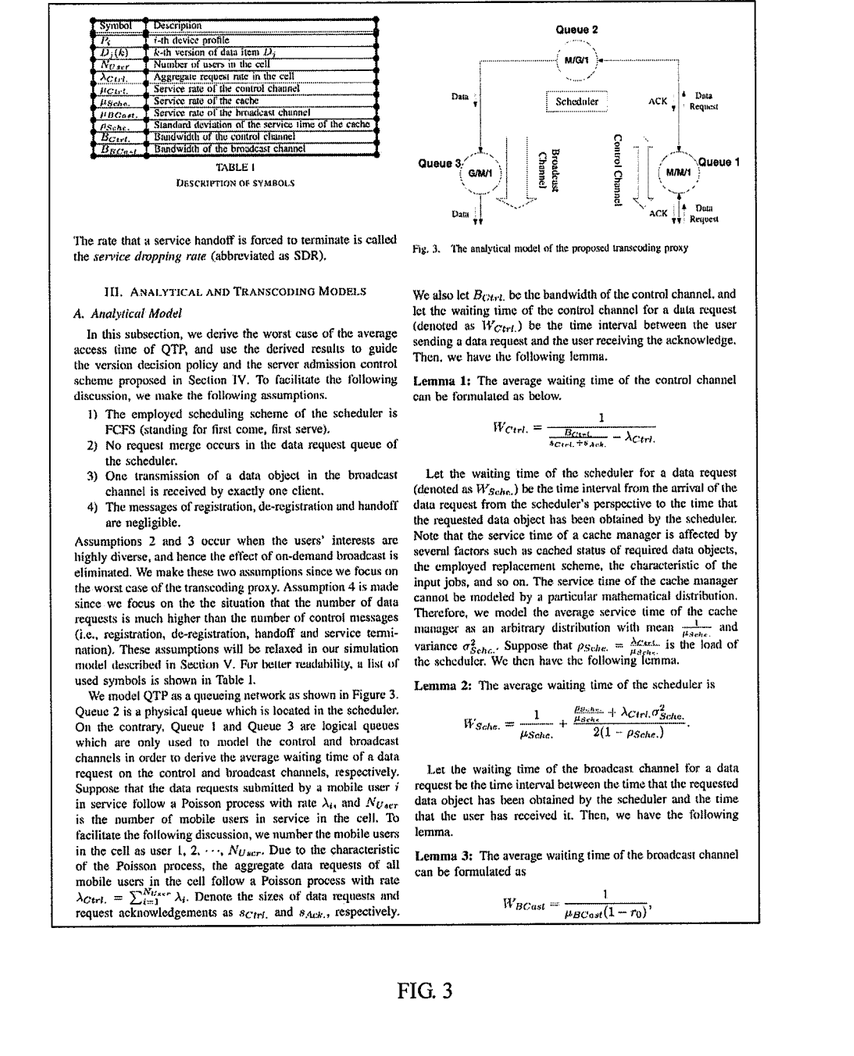
FIG. 3 is a schematic diagram illustrating detection of intersection points between table outer peripheral borders and table lines in the table recognizing method according to an embodiment of the present invention.

Embodiment 3:

FIG. 2 is a flowchart of a table recognizing method corresponding to the table recognizing system described in this embodiment, comprising the following steps:

(1) Extracting: parsing metadata information in an original fixed-layout document using a parsing engine, and extracting basic elements on a page of the document, which comprise text elements, image elements, and graphic operations. The text elements comprise text code, font type, font color, and font size, and etc.; and the image elements comprise natural images and synthetic images; and the graphic operation graphic element information comprises operation information of drawing lines and drawing graphs and so on.

(2) Segmenting: clustering the text elements, the image elements, and graphic operation elements, segmenting contents on a page, and acquiring fragments. Herein the segmented text lines are extracted based on clustering analysis, for example, an XY-cut method. The fragments are acquired according to area types of the text elements, the image elements, and the graphic operation elements.

(3) Constructing an undirected graph: constructing a undirected graphs with respect to the fragments. The undirected graph is a construction according to a neighborhood relationship of the fragments, wherein the neighborhood relationship refers to a neighborhood of a fragment to the adjacent fragments thereof, and herein the undirected graph is constructed based on a minimal spanning tree.

The principles of the minimum spanning tree are specifically as follows: A spanning tree of a page graph contains all the vertices of a graph. Given n vertices or page fragments, the spanning tree has n−1 edges. In the given undirected graph $G=(V, E)$, $e_{s-t}$ represents a edge connecting vertex $v_s$ and $v_t$ ($e_{s-t} \in E$)$w(s,t)$ represents weight of the edge. If an acyclic subset $F \subseteq E$ containing all the vertices and the total weight is minimal, then F is the minimal spanning tree (MST) of graph G.

$$w(F) = \sum_{(v_s, v_t)} w(s, t)$$

Figure 4:
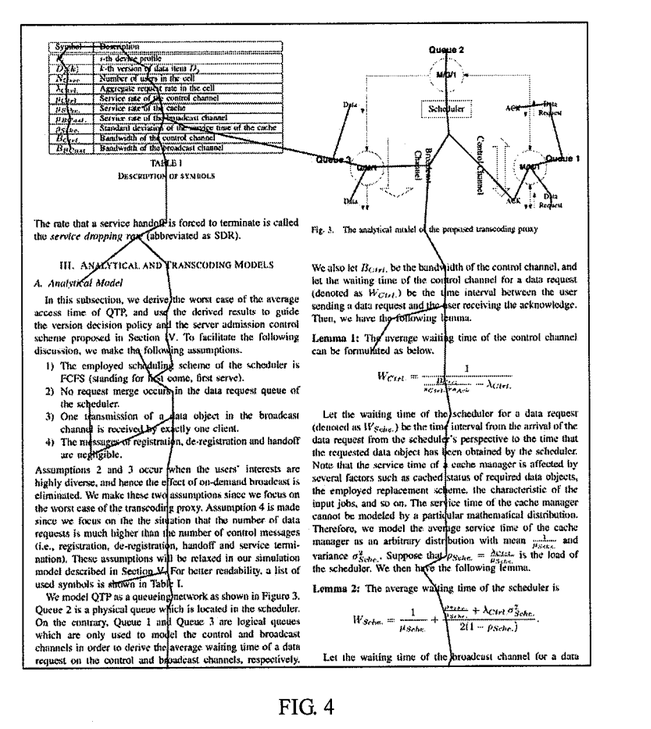
FIG. 4 is a schematic diagram of a minimal spanning tree of fragments on a page in the table recognizing method according to an embodiment of the present invention.
Figure 5:
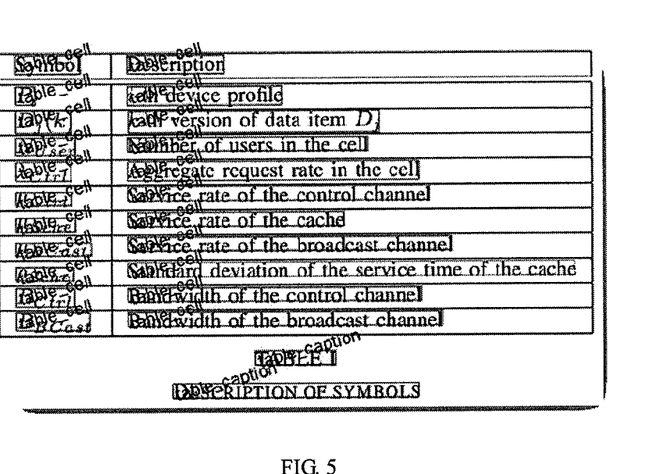
FIG. 5 is a schematic diagram of table cell labels in the table recognizing method according to an embodiment of the present invention.

Therefore, undirected graphs are constructed with respect to the fragments based on the minimum spanning tree. FIG. 4 is a schematic diagram of a minimal spanning tree of fragments on a page.

In addition, in an alternative embodiment, Delaunay triangulation may also be used to construct a undirected graph. The Delaunay triangulation method has two features: maximizing the minimal angle and the closest regularized triangulated network, and uniqueness (any four points cannot be concyclic). Therefore, the undirected graph can be built using the Delaunay triangulation method of the prior art.

(4) Detecting cells: extracting an image on the page, detecting intersection points of horizontal lines and vertical lines, detecting an external bounding box of the intersection points, and taking whether the partitioned text fragments fall within the external bounding box as local relationship features; wherein the local relationship features comprise: left alignment, right alignment, center alignment, and within or without external bounding box. In this step, in addition to detecting the intersection points of the horizontal lines and the vertical lines based on connected components, the intersection points may also be detected based on such image processing methods as Hough Transform.

(5) Classifying: extracting the local features of the fragments in the undirected graphs, classifying the extracted local features using an SVM classifier, selecting an RBF, converting a classification score based on the local features into the pseudo probability by using the Platt method, and taking the pseudo probability as a unary feature function of the CRF model; extracting the neighborhood relationship features among fragments according to graph neighborhood relationships, and using the extracted neighborhood relationships as a binary feature function.

The SVM is a trainable machine learning method, and principles of the SVM are generalized as follows: The SVM is directed to linear separability analysis, in cases of linear non-separability, a low-dimensional input spatial linear non-separable samples are converted into high-dimensional feature spatial to enable linear separability by using a non-linear mapping algorithm, such that it is possible to linearly analyze non-linear features of the samples in the high-dimensional feature space using the linear algorithm. In this step, the features are classified by using the SVM. Radial Basis Function is employed as the kernel function. The classification score is converted into the pseudo probability by using the Platt method (6) Training and recognizing: training a learning model according to the local relationship features, local features of the fragments, and neighborhood relationship features among the fragments, acquiring model parameters, and establishing a table recognizing model;

The PMG is a collection of models representing probability-based correlations using graphics, and is capable of integrally utilizing multiple features and contextual information. In this embodiment, the neighborhood relationship among fragments on the page is expressed as an undirected graph structure, and the issue of logical annotations is transformed into the issue of fragment labeling based on the undirected PMG.

The CRF model is a discriminate probability model, which is a type of random field and is typically used to label sequence data, for example, natural language text or biological sequences. The CRF is capable of expressing long-distance dependency and overlap features, and better solving issues like-label bias problem. In addition, all features may be globally normalized and a global optimal solution may be reached. The CRF algorithm has been widely applied in academic research and industrial fields. To be specific, the CRF model is advantageous in better using observation information and adaptive contextual information of the fragments.

According to the table recognizing method provided in this embodiment, by using multiple features and various contextual information, ambiguous classification results can be reduced. In this embodiment, the multi-feature design covers unary local features and binary neighborhood features. The unary features are mainly features of the fragments (i.e., neighborhood relationship features among the fragments), and the binary features are relationship features (i.e., neighborhood relationship features among the fragments) of the neighbor fragments in the undirected graphs. The target function of the CRF model is a negative log-likelihood function.

The specific process of this step is as follows: extracting binary features between text fragments according to graph neighborhood relationships, wherein the features comprise: left alignment or not, right alignment or not, center alignment or not; the same font and font size or not; overlap or not; and width ratio, height ratio, and area ratio of two fragments. The unary and binary feature functions are extracted, the CRF model is trained to acquire model parameters, and finally a recognizing result about the table labels is acquired.

(7) Invoking the table recognizing model to perform table recognizing for the document, and acquiring a recognizing result. When the table in a document needs to be recognized, the established table recognizing model is invoked to perform automatic recognizing, and thus a recognizing result is acquired. According to the table recognizing method, the table is extracted, and logical labels are defined according to the function of the table, thereby implementing typographic analysis and understanding on the table in a document in the original layout. In addition, table recognizing may also be based on analysis of the logical function of the table, thereby improving accuracy in table recognizing in the document in the original layout.

Obviously, the above embodiments are merely exemplary ones for illustrating the present invention, but are not intended to limit the present invention. Persons of ordinary skills in the art may derive other modifications and variations based on the above embodiments. Embodiments of the present invention are not exhaustively listed herein. Such modifications and variations derived still fall within the protection scope of the present invention.

Those skilled in the art shall understand that the embodiments may be described as illustrating methods, systems, or computer program products. Therefore, hardware embodiments, software embodiments, or hardware-plus-software embodiments may be used to illustrate the present invention. In addition, the present invention may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present invention is described based on the flowcharts and/or block diagrams of the method, device (system), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, wherein the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although preferred embodiments are described, those skilled in the art may make modifications and variations to these embodiments based on the basic inventive concept of the present invention. Therefore, the preferred embodiments and all such modifications and variations shall fall within the protection scope subject to the appended claims.

What is claimed is:

1. A method realized by a computer for recognizing at least one table in one or more documents, comprising:
    parsing and analyzing metadata information in an original fixed-layout document, and extracting basic graphic elements on a page of the document;
    segmenting the basic graphic elements, extracting segmented text lines on the page which represent border lines of the table to be recognized within the page, and acquiring segments;
    constructing an undirected graph with respect to each of the segments;

extracting an image on the page, detecting a plurality of intersection points formed by a plurality of horizontal lines and a plurality of vertical lines respectively, detecting an external envelop matrix formed by the plurality of intersection points, and taking whether the segmented text lines fall within the external envelop matrix as local relationship features which indicate whether the segmented text lines are parts of the table to be recognized;

training a learning model according to the local relationship features, local features of the segments, and neighborhood relationship features among the segments, acquiring model parameters, and establishing a table recognizing model based on the acquired model parameters; and invoking the table recognizing model to perform table recognizing for the document, so as to get a recognizing result.

2. The method according to claim 1, wherein the training a learning model according to the local relationship features, local features of the segments, and neighborhood relationship features among the segments, acquiring model parameters, and establishing a table recognizing model based on the acquired model parameters comprises:

extracting the local features of segments in the undirected graphs, classifying the extracted local features, converting a classification score into a pseudo probability, and taking the pseudo probability as a univariate feature function of a Conditional Random Fields (CRF) model; and extracting the neighborhood relationship features among the segments according to graph neighborhood relationships, and using the extracted neighborhood relationship features as a bivariate feature function, wherein the learning model is a CRF model.

3. The method according to claim 1, wherein the segmenting the basic graphic elements, extracting segmented text lines on the page, and acquiring segments comprises: segmenting continuous texts in the text lines into one segment.

4. The method according to claim 1, wherein the segmented text lines on the page are extracted based on clustering.

5. The method according to claim 1, wherein the constructing an undirected graph with respect to each of the segments comprises: constructing the undirected graph by using a neighborhood relationship of the segments.

6. The method according to claim 1, wherein the constructing an undirected graph with respect to each of the segments comprises: constructing the undirected graph based on a Minimal Spanning Tree (MST).

7. The method according to claim 1, wherein the detecting intersection points of horizontal lines and vertical lines comprises: detecting the intersection points of horizontal lines and vertical lines based on connected components.

8. The method according to claim 1, wherein the local features of the segment comprise: a length-to-width ratio, a normalized area, an indent level, and an image textual feature.

9. The method according to claim 2, wherein the extracting the local features of segments in the undirected graphs, classifying the extracted local features, converting a classification score into a pseudo probability comprises: classifying the extracted local features using a Support Vector Machine (SVM) classifier, selecting a Radial Basis Function (RBF), and converting a classification score into the pseudo probability.

10. The method according to claim 1, wherein the local relationship features comprise: left justify, right justify, center justify, and within or without external envelop.

11. A system realized by a computer for recognizing at least one table in one or more documents, comprising:

an extracting unit, configured to parse and analyze metadata information in an original fixed-layout document, and extract basic graphic elements on a page of the document;

a segmenting unit, configured to segment the basic graphic elements, extract segmented text lines on the page which represent border lines of the table to be recognized within the page, and acquire segments;

a constructing unit, configured to construct an undirected graph with respect to each of the segments;

a detecting unit, configured to extract an image on the page, detect a plurality of intersection points formed by a plurality of horizontal lines and a plurality of vertical lines respectively, detect an external envelop matrix formed by the plurality of intersection points, and take whether the segmented text lines fall within the external envelop matrix as local relationship features which indicate whether the segmented text lines are parts of the table to be recognized;

a modeling unit, configured to train a learning model according to the local relationship features, local features of the segments, and neighborhood relationship features among the segments, acquire model parameters, and establish a table recognizing model based on the acquired model parameters; and an invoking unit, configured to invoke the table recognizing model to perform table recognizing for the document, so as to get a recognizing result.

12. The system according to claim 11, wherein the learning model is a Conditional Random Fields (CRF) model, and the modeling unit comprises:

a first feature extracting subunit, configured to extract the local features of segments in the undirected graphs; classify the extracted local features, convert classification score into a pseudo probability, and take the pseudo probability as a univariate feature function of the CRF model; and a second extracting subunit, configured to extract the neighborhood relationship features among the segments according to graph neighborhood relationships, and use the extracted neighborhood relationships as a bivariate feature function.

13. The system according to claim 11, wherein the segmenting unit is configured to segment continuous texts in the text lines into one segment.

14. The system according to claim 11, wherein the segmenting unit is configured to extract the segmented text lines on the page based on clustering.

15. The system according to claim 11, wherein the constructing unit is configured to construct the undirected graph by using a neighborhood relationship of the segments.

16. The system according to claim 11, wherein the constructing unit is configured to construct the undirected graph with respect to each of the segments based on a minimal spanning tree.

17. The system according to claim 11, wherein the detecting unit is configured to detect the intersection points of the horizontal lines and the vertical lines based on connected components.

18. The system according to claim 11, wherein the local features of the segments comprise: a length-to-width ratio, a normalized area, an indent level, and an image textual feature.

19. The system according to claim 12, wherein the first feature extracting unit is configured to classify the extracted local features using a Support Vector Machine (SVM) classifier, select a Radial Basis Function (RBF), and convert a classification score into the pseudo probability.

20. The system according to claim 11, wherein the local relationship features comprise: left justify, right justify, center justify, and within or without external envelop.

* * * * *